Sept. 9, 1930.  A. WEISS  1,775,610
REEL FOR CAMERAS AND PROJECTORS
Filed Oct. 22, 1927
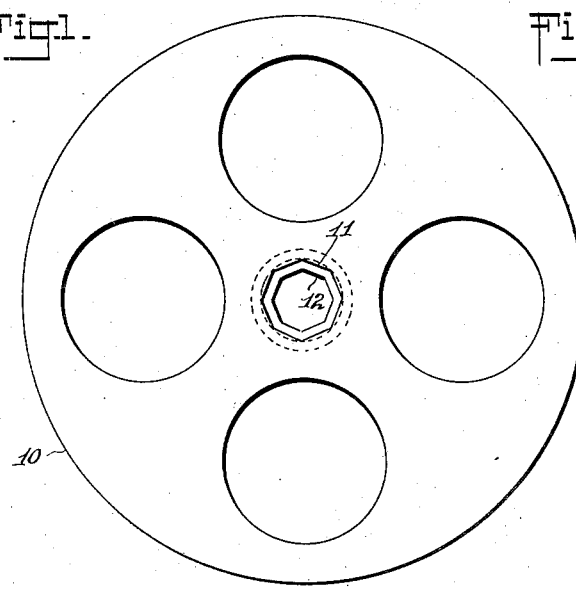
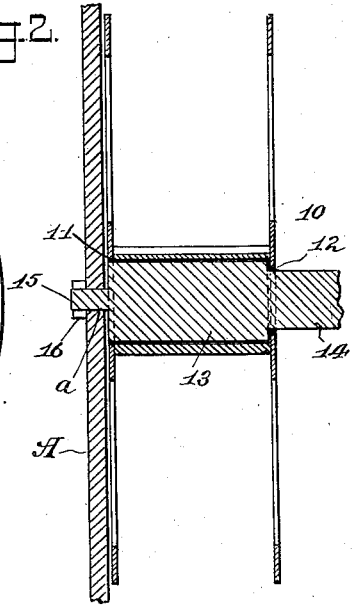
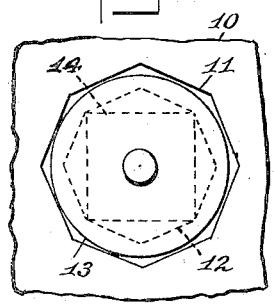
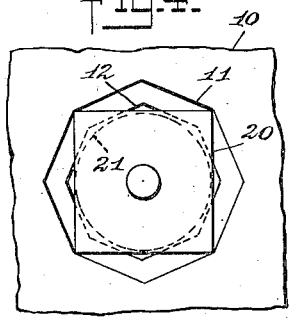
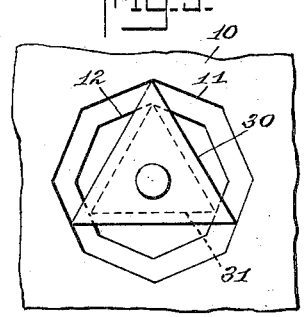
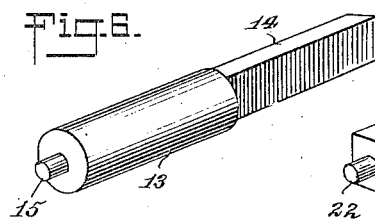
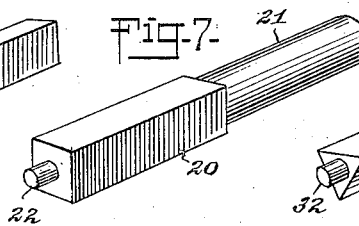
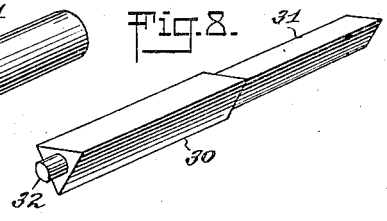
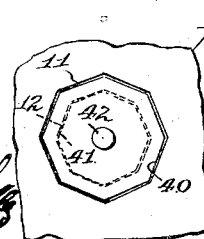
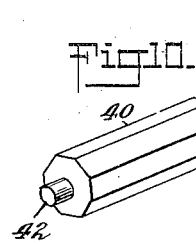
WITNESSES
INVENTOR
Alfred Weiss
BY
ATTORNEY Patented Sept. 9, 1930

1,775,610

UNITED STATES PATENT OFFICE

ALFRED WEISS, OF NEW YORK, N. Y.

REEL FOR CAMERAS AND PROJECTORS

Application filed October 22, 1927. Serial No. 227,934.

My invention relates to reels employed in cameras and projecting machines. It has been proposed to form a reel with a shaft or spindle so formed and so co-ordinated with the reel that the reverse mounting of the reel is made impossible. The means proposed for effecting this purpose is that the spindle has a reel-supporting portion and a reel-receiving portion adapted to be accommodated respectively in larger and smaller holes in the respective sides of the reel.

The general object of my invention is to provide a reel having at the respective sides thereof openings to accommodate the spindle, and so formed that an infinite variety of spindles may be accommodated in the reel and serve to turn same.

For carrying out the stated general object of my invention I form in the reel at opposite sides larger and smaller octagonal openings to accommodate the spindle.

The nature of my invention and its advantages and mode of functioning will be readily understood from the description following.

Reference is to be had to the accompanying drawings forming part of this specification, it being understood that the drawings are merely illustrative of examples of the invention.

Figure 1 is a side view of a reel formed in accordance with my invention;

Figure 2 is a sectional view taken centrally through the reel and through a portion of a camera or projecting machine;

Figure 3 is an enlarged view of the central portion of the reel with the camera part omitted;

Figure 4 is a view similar to Figure 3 given to illustrate the spindle accommodated in the reel of a different form from the spindle shown in Figures 2 and 3;

Figure 5 is a view similar to Figures 3 and 4 but illustrating the use of a spindle of still another form from that shown in Figures 3 and 4;

Figure 6 is a perspective view of a spindle having the form shown in use in Figures 2 and 3;

Figure 7 is a perspective view of the spindle the use of which is illustrated in Figure 4;

Figure 8 is a perspective view of a spindle the use of which is illustrated in Figure 5;

Figure 9 is a view similar to Figures 3 to 5 but illustrating the use of a spindle of still another form; and Figure 10 is a perspective view of a spindle, the use of which is illustrated in Figure 9.

My improved reel designated generally as 10 has formed at one side of the reel, that is, at one end of the hub of the reel, a relatively large octagonal opening 11, and at the opposite end of the hub of the reel a smaller octagonal opening 12 is formed.

Referring particularly to Figures 2, 3 and 6, the spindle on which the reel is mounted and which serves to turn the reel with the turning of the spindle is formed with an enlarged cylindrical portion 13 and a smaller polygonal portion 14. The spindle also has a stud or trunnion 15 provided with a collar 16 or equivalent, said trunnion 15 being adapted to be turnably received in the bearing $a$ of a camera or projector, a portion of which is conventionally indicated at A in Figure 2. The cylindrical portion 13 of the spindle of Figures 2, 3 and 6 is received within the hub of the reel 10 and extends through the enlarged opening 11. The opposite end of said portion 13 lies adjacent to that side of the reel 10 having the smaller octagonal opening 12.

It will be seen from Figure 2 that although the larger and smaller openings 11 and 12 are octagonal, nevertheless, said openings will snugly accommodate the large cylindrical portion 13 with the sides of the octagonal opening 11 tangential to said cylindrical portion 13, whereas the opposite squared end 14 of the spindle is accommodated in smaller opening 12 at the angles of the square presented by the adjacent sides of the said smaller opening 12.

In order that it may appear that an infinite variety in the shape of the respective portions of the spindle may be accommodated in the reel having two octagonal openings 11 and 12, I illustrate examples in Figures 4, 5 and 9 with the spindle shown respectively in Figures 7, 8 and 10. Thus in Figure 4 is a spindle such as is shown in Figure 7 is shown fitted to reel 10. In said Figures 4 and 7 the spindle has an enlarged squared end 20 accommodated in alternate angles of the enlarged octagonal opening 11, while the opposite end portion 21 of the spindle is cylindrical. Thus the spindle of Figure 7 is the reverse of Figure 6 with the cylindrical portion 21 of the spindle shown in Figure 7 accommodated in the smaller octagonal opening 12 of the reel 10, the sides of said octagonal opening 12 being in a line tangential to the cylindrical surface of the portion 21 of the spindle shown in Figure 7. In Figure 7 the spindle has a trunnion 22 corresponding to trunnion 15 of Figure 6.

In the forms shown in Figures 5 and 8 the spindle has an enlarged portion 30 of triangular cross section, and a smaller portion 31 also of triangular cross section. In said Figures 5 and 8 the enlarged triangular portion 30 is accommodated at the apex of the triangle in one angle of the larger octagonal opening 11, while the remaining two angles of the triangular portion 30 touch at points at two opposite surfaces of the said octagonal opening 11. In a similar way the apex of the smaller triangular portion 31 is accommodated in one angle of the smaller octagonal opening 12, while the two opposite angles of the triangle touch at two opposite sides of said smaller opening 12, the result being that the triangular spindle of Figure 8 and the spindles of Figures 6 and 7 snugly accommodate themselves to the reel 10 to the octagonal openings 11 and 12 and in a manner to turn the reel with the turning of said spindles by the usual spindle drive means (not shown).

In Figures 9 and 10 is illustrated the use of a spindle having an enlarged octagonal portion 40 and a smaller octagonal portion 41. Thus the larger octagonal portion 40 exactly conforms to the octagonal portion 11, while the smaller octagonal portion 41 corresponds exactly with the smaller octagonal portion 12.

The numeral 42 indicates a trunnion corresponding with trunnions 15 in Figure 2, 22 of Figure 7 and 32 of Figure 8.

I thus produce a reel adapted to successfully accommodate a spindle presenting a multiplicity of forms, such as round, square, triangular or octagonal.

I would state furthermore that while the illustrated examples constitute practical embodiments of my invention, I do not limit myself strictly to the exact details herein illustrated, since, manifestly, the same can be considerably varied without departure from the spirit of the invention as defined in the appended claim.

I claim:

A reel and hub assembly, comprising a reel having side flanges and a hub, said flanges having bearing apertures centrally therethrough within the confines of said hub, said apertures being of different sizes and of similar angled configuration, the larger of said apertures having angled faces arranged with their apexes abutting the hub, and a spindle having an angled faced portion receivable within said hub, said portion conforming in size and configuration with said larger aperture, whereby the apexes of its angled faces will engage the inner face of said hub, said spindle further including a similarly configured smaller extending portion which is adapted to extend through and embrace the walls of the other aperture.

Signed at New York city, in the county of N. Y. and State of N. Y. this 17th day of October, A. D. 1927.

ALFRED WEISS.